(12) United States Patent
Brandsma

(10) Patent No.: US 9,326,345 B2
(45) Date of Patent: Apr. 26, 2016

(54) LIGHTING CONTROL METHOD, COMPUTER PROGRAM PRODUCT AND LIGHTING CONTROL SYSTEM

(71) Applicant: NXP B.V., Eindhoven (NL)

(72) Inventor: Ewout Brandsma, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 14/188,323

(22) Filed: Feb. 24, 2014

(65) Prior Publication Data

US 2014/0239822 A1 Aug. 28, 2014

(30) Foreign Application Priority Data

Feb. 26, 2013 (EP) ..................................... 13156768

(51) Int. Cl.
*H05B 33/08* (2006.01)
*H05B 37/02* (2006.01)

(52) U.S. Cl.
CPC ........ *H05B 33/0854* (2013.01); *H05B 37/0218* (2013.01); *Y02B 20/46* (2013.01)

(58) Field of Classification Search
USPC ......... 315/307, 308, 149, 152, 153, 155, 154, 315/159, 150, 151; 340/635, 641
See application file for complete search history.

(56) References Cited

U.S. PATENT DOCUMENTS

| | | | |
|---|---|---|---|
| 6,340,864 B1 | 1/2002 | Wacyk | |
| 8,786,189 B2 * | 7/2014 | Mayfield et al. | ................. 315/76 |
| 8,977,371 B2 | 3/2015 | Ashdown | |
| 2007/0109142 A1 | 5/2007 | McCollough, Jr. | |
| 2007/0229250 A1 | 10/2007 | Recker et al. | |
| 2008/0136356 A1 | 6/2008 | Zampini et al. | |
| 2013/0271268 A1 | 10/2013 | Brandsma et al. | |
| 2014/0097758 A1 * | 4/2014 | Recker et al. | ................. 315/152 |

FOREIGN PATENT DOCUMENTS

| | | |
|---|---|---|
| CN | 102301827 A | 12/2011 |
| EP | 1 479 899 A2 | 11/2004 |
| EP | 2 362 714 A1 | 8/2011 |
| EP | 12182670 | 8/2012 |
| JP | 2010123483 A | 6/2010 |
| WO | 2007/072285 A1 | 6/2007 |
| WO | 2008029323 A1 | 3/2008 |
| WO | 2010010491 A2 | 1/2010 |

OTHER PUBLICATIONS

Wu, Yan, et al.; "System Study of a 60 GHz Wireless-Powered Monolithic Sensor System"; IEEE Information, Communications and Signal Processing (ICICS) 2011 Intl' Conference on; pp. 1-5 (Dec. 13-16, 2011).

(Continued)

*Primary Examiner* — David H Vu

(57) ABSTRACT

According to an aspect of the invention, a lighting control method is conceived for controlling the illumination of a working area, wherein an RFID-enabled light sensor attached to said working area measures incident light on the working area, and wherein an RFID-enabled luminary periodically reads the measured incident light from the RFID-enabled light sensor and adapts its light level in dependence on the measured incident light, such that a predefined illumination level on the working area is maintained.

18 Claims, 5 Drawing Sheets

(56) References Cited

OTHER PUBLICATIONS

Philips; "Luxsense Lighting Control Datasheet"; retrieved from the internet http://www.lighting.philips.com/pwc_li/me en/products/controls/assets/LRL1220ds.pdf; 5 pages (Jan. 30, 2014).

Extended European Search Report for Application 13156768.7 (Jan. 29, 2014).
CN office action for counterpart patent appln. No. 201410059865.5 (Sep. 6, 2015).

* cited by examiner

LIGHTING CONTROL METHOD, COMPUTER PROGRAM PRODUCT AND LIGHTING CONTROL SYSTEM

CROSS-REFERENCE TO RELATED APPLICATIONS

This application claims the priority under 35 U.S.C. §119 of European patent application no. 13156768.7, filed on February, the contents of which are incorporated by reference herein.

FIELD OF THE INVENTION

The invention relates to a lighting control method, a computer program product and a lighting control system.

BACKGROUND OF THE INVENTION

About 40% of world-wide energy consumption can be attributed to the built environment. Therefore, energy conservation in buildings is a key concern for building developers, building inhabitants and governments alike. A significant chunk of building energy usage is related to lighting. For example, in office buildings, many luminaries (e.g. fluorescent tubes) are employed to create sufficient illumination on desk surfaces (a typical value is 500 lux). Daylight dependent dimming is one of the approaches used to conserve energy for lighting. A light sensor is used to measure the ambient light level and the luminary is dimmed down if sufficient light (i.e. daylight from the windows) is already present.

Present day daylight dependent dimming systems typically rely on a sensor built into the luminary itself. That sensor is an integral part of the luminary and controls the light level of the particular luminary depending on the amount of light it senses (more light, more dimming). This is a very simple and relatively cost-effective system, as all control is local to the luminary itself. Installation is also quite straightforward, i.e. it is not different from installing a non-dimming luminary. As a matter of fact, if a luminary is already equipped with a dimmable ballast, the light sensor can be retrofitted into that existing luminary by simply clicking it onto the tube and by making a two-wire connection to the 0-10V control signal input of the ballast. This control signal input is also capable of sourcing a limited supply current to the light sensor.

It should be observed however, that the light sensor doesn't directly measure the amount of tight incident on the working area (i.e. desk surface). Instead it measures light reflected off the working area and/or the floor. In other words, an indirect (and consequently inaccurate) measurement is done of the light level on the working area. As part of commissioning, a knob is turned in the sensor to set a set point. This set point will depend on the desired light level on the working area, but also on the reflectivity of that working area and/or the floor. This implies that the set point needs to be changed if the aforementioned reflectivity changes (e.g. new carpet, different desk or more clutter on the desk). Typically this is not done. As a result of the issues mentioned above, these present day daylight dependent dimming systems are not very effective.

Furthermore, it is not possible to adapt the light level to the specific needs of a particular office worker. It should be noted that the light level required is very task and person dependent. For example, an elderly person will have less transparent eye lenses and might need up to four times more light intensity than a younger person.

Systems to directly measure the light level incident on the working area are known in the art. For example, there are desk sensors measuring light level as well as temperature and presence. It is also known to place such desk sensors on the working area (desk surface) and directly measure incident light. The desk sensors use wireless communication to communicate sensor values to the luminary, which adapts its light level accordingly. Furthermore, these desk sensors normally have some User Interface (UI) controls to set a set point, which is also communicated to the luminary.

W0 2010/010491 describes an example of an existing desk sensor. In particular, W0 2010/010491 describes an illumination system that comprises: a light source; a controller controlling the power output of the light source; a light sensor wirelessly communicating with the controller. In a normal mode, the controller controls the light source such that the light level remains substantially constant. In a change mode, the controller controls the light source such that the light level is gradually changed with a predetermined change rate such as to decrease a deviation from a target level. The controller switches from its normal mode to its change mode on the basis of input signals received from the light sensor. The light sensor measures a light level, and decides whether or not to communicate a signal to the controller. The light sensor refrains from transmitting a signal when receiving the signal will not cause the controller to change its control behavior.

A conventional desk sensor still has a number of drawbacks:

It is a relatively costly device.

It needs a power source of its own. One possibility is to recharge a battery with a small PV panel, but this also incurs cost. If the office isn't used for an extended period of time, the battery of the desk sensor may run out.

Commissioning is needed to establish a control relationship between each desk sensor and the most appropriate luminary to control (i.e. the luminary that is closest to the desk). If the desk is moved, this control relationship needs to be adapted. Although relatively simple means for establishing control relationships already exist (see for example the European patent application titled "Method for Establishing Control Relationships, Configuration Device, Networked Device and Computer Program Product", application Ser. No. 12/182,670.5, filed by NXP B.V. on 31 Aug. 2012) manual action is still needed each time the desk is moved.

On a cluttered desk the light sensor might easily be covered, causing the luminary to produce too much light and hence waste energy.

In view of the above, there exists a need for a lighting control method and system, in particular involving a working area sensor which is ultra-low cost, which has a small firm or, which doesn't require a power source of its own and which is commissioned completely automatically. Furthermore, there is a need to alleviate the "cluttered working area" problem.

SUMMARY OF THE INVENTION

It is an object of the invention to alleviate the aforementioned need. This object is achieved by a lighting control method, a computer program product, and a lighting control system.

According to an aspect of the invention, a lighting control method is conceived for controlling the illumination of a working area, wherein an RFID-enabled light sensor attached to said working area measures incident light on the working area, and wherein an RFID-enabled luminary periodically reads the measured incident light from said RFID-enabled light sensor and adapts its light level in dependence on the measured incident light, such that a predefined illumination level on the working area is maintained.

According to an exemplary embodiment of the lighting control method, the RFID-enabled luminary adapts its light level by comparing the measured incident light with a set point, and adjusting the light output of a lighting element embedded in said RFID-enabled luminary in dependence on the result of said comparing.

According to a further exemplary embodiment of the lighting control method, the set point is stored in the RFID-enabled luminary.

According to a further exemplary embodiment of the lighting control method, the set point is stored in the RFID-enabled light sensor and the RFID-enabled luminary reads both the measured incident light and the set point from the RFID-enabled light sensor.

According to a further exemplary embodiment of the lighting control method, the set point is written into a non-volatile memory unit of the RFID-enabled light sensor by means of a portable RFID reader.

According to a further exemplary embodiment of the lighting control method, the set point is stored in a user interface RFID tag and the RFID-enabled luminary reads the set point from said user interface RFID tag.

According to a further exemplary embodiment of the lighting control method, a further RFID-enabled light sensor attached to said working area measures the incident light on the working area, and the RFID-enabled luminary periodically reads the measured incident light from the RFID-enabled light sensor and from the further RFID-enabled light sensor, and the RFID-enabled luminary adapts its light level in dependence on the incident light measured by both the RFID-enabled light sensor and the further RFID-enabled light sensor.

According to a further exemplary embodiment of the lighting control method, a further RFID-enabled light sensor attached to a further working area measures the incident light on the further working area, the MD-enabled luminary periodically reads the measured incident light from the RFID-enabled light sensor and from the further RFID-enabled light sensor, and the RFID-enabled luminary adapts its light level in dependence on the incident light measured by both the RFID-enabled light sensor and the further RFID-enabled light sensor, such that a predefined illumination level on both the working area and said further working area is maintained.

According to a further exemplary embodiment of the lighting control method, a selection protocol is executed in order to assign the RFID-enabled light sensor to the RFID-enabled luminary.

According to a further exemplary embodiment of the lighting control method, the selection protocol is based on an RF-based closeness measure and/or an illumination-based closeness measure.

According to a further exemplary embodiment of the lighting control method, said RF-based closeness measure and/or illumination-based closeness measure are stored in a memory unit of the RFID-enabled light sensor.

According to a further exemplary embodiment of the lighting control method, a further RFID-enabled luminary operates as a slave luminary to the RFID-enabled luminary.

According to a further exemplary embodiment of the lighting control method, no RFID-enabled light sensor is assigned to the further RFID-enabled luminary, and the further RFID-enabled luminary is closer to said RFID-enabled light sensor than to any further RFID-enabled light sensor.

According to a further exemplary embodiment of the lighting control method, the further RFID-enabled luminary adapts its light level in dependence on the incident light measured by said RED-enabled light sensor to substantially the same degree as the RFID-enabled luminary adapts its light level.

According to another aspect of the invention, a computer program product is conceived that comprises program elements executable by an RFID-enabled light sensor or an RFID-enabled luminary, wherein each program element comprises program instructions which, when being executed by the RFID-enabled light sensor or the RFID-enabled luminary, cause said RFID-enabled light sensor and RFID-enabled luminary to carry out or control respective steps of a lighting control method as claimed in any preceding claim.

According to a further aspect of the invention, a lighting control system is conceived for controlling the illumination of a working area, said lighting control system comprising at least one RFID-enabled light sensor attached to said working area and at least one RFID-enabled luminary, wherein the RFID-enabled light sensor is arranged to measure incident light on the working area, and wherein the RFID-enabled luminary is arranged to periodically read the measured incident light from said RFID-enabled light sensor and to adapt its light level in dependence on the measured incident light, such that a predefined illumination level on the working area is maintained.

According to an exemplary embodiment of the lighting control system, the RFID-enabled light sensor is a sticker attached to the working area.

According to a further exemplary embodiment of the lighting control system, the RFID-enabled light sensor is integrated into the working area.

According to a further exemplary embodiment of the lighting control system, the working area is a piece of furniture, in particular a desk, or an apparatus for personal use, in particular a PC monitor.

BRIEF DESCRIPTION OF THE DRAWINGS

The invention will be described in more detail with reference to the appended drawings, in which.

DESCRIPTION OF EMBODIMENTS

Figure 1:
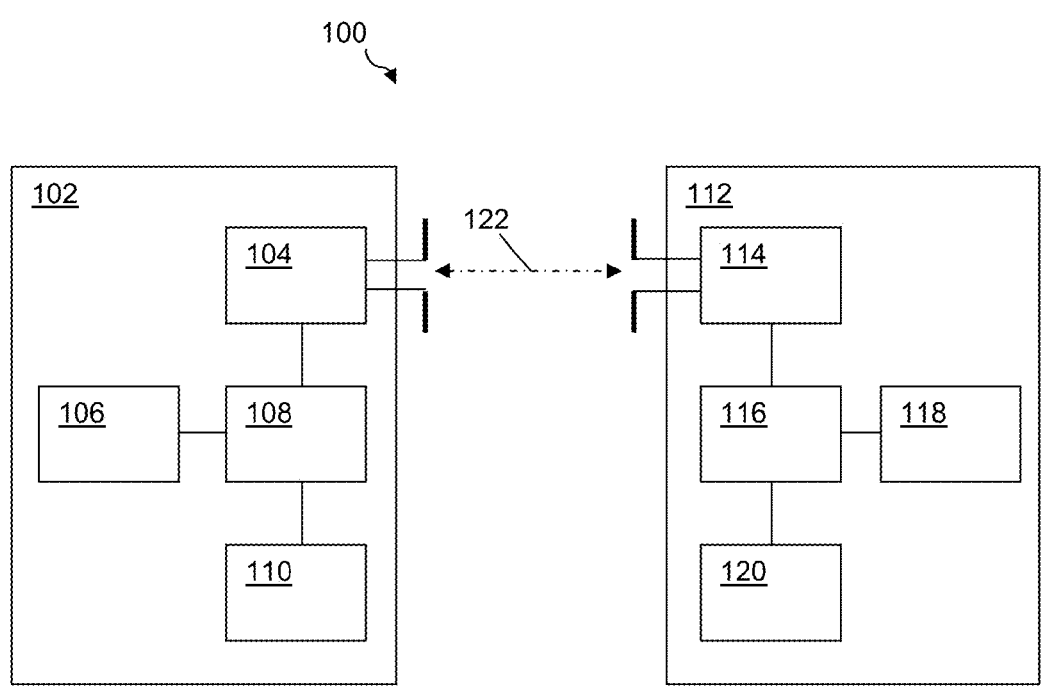
FIG. 1 illustrates a lighting control system according to an exemplary embodiment of the invention.

Disclosed herein are a lighting control method and a corresponding lighting control system which enable daylight dependent dimming. The lighting control system comprises at least one RFID-enabled light sensor, for example an RFID-enabled desk sensor, and at least one RFID-enabled luminary. In the following description, reference is made to a "desk sensor". This "desk sensor" is an example of an RFID-enabled light sensor. Furthermore, reference is made to a "luminary". The term "luminary" is short for "RFID-enabled luminary".

According to an exemplary embodiment of the invention, the desk sensor comprises a light sensor and a (passive) RFID interface. Preferably, it does not comprise a power source of its own, but instead it can obtain its operational power from an (active) RFID reader. Typically, the desk sensor is placed on or around a working area (for example a desk surface) with its light sensor facing upwards.

The luminary comprises a lighting element and an (active) RFID reader capable of reading (and powering) a desk sensor placed at a moderate distance, for example 2 to 3 meters. Typically, the luminary is a ceiling mounted luminary.

According to an exemplary embodiment of the invention, the luminary periodically reads the desk sensor and adapts, i.e. increases or decreases, the light level of its lighting element to maintain a predefined illumination level on the working area, corresponding to a set point.

The lighting control method and corresponding lighting control system achieve both low cost and fully automatic commissioning. The low cost is a consequence of the desk sensor being ultra-low cost: a simple sensing tag without a power source of its own, that may take the shape of a sticker or a furniture-integrated integrated circuit (IC). The automatic commissioning is a consequence of the short operating distance of the RFID communication, including supply of power, i.e. a luminary will only be able to access desk sensors within its scope of illumination. Additional embodiments are described to handle multiple luminaries and desk sensors in a room and to provide simple user control over the set point.

The desk sensor may for example comprise a an RFID tag coupled to a light sensor. The luminary may for example comprise an RFID reader capable of reading the desk from a moderate distance, for example 2 to 3 meters. Preferably, the operating energy of the RFID tag is provided by the RFID reader by means of an RE field. In other words, the RFID tag may be passive. As a result, the desk sensor doesn't require a power source of its own.

The operating range of the RFID reader on powerless RFID tags is physically limited to the moderate distance of a few meters. This property provides the following benefit: ceiling mounted luminaries can only read desk sensors in their direct vicinity, i.e. only desk sensors present on the desks that they can actually illuminate.

The UCODE standard (ISO18000-6), which operates in the 860-960 MHz band is an example of an RFID standard enabling such functionality. Other technologies may also be used. For example, NFC or ICODE (operating at 13.56 MHz) is also capable of transferring data and operating energy over short distances. Typically, those distances are only in the order of centimeters rendering this technology, in unaltered form, less suitable for a lighting control system of the kind set forth. However, if larger antenna coils are employed, larger distances are possible.

For example, in the European patent application EP 1 479 988 A2 a household appliance, in particular a refrigerator, is described, which uses art ICODE (ISO15693) RFID reader with a large antenna coil to read temperature sensors employed throughout the appliance.

As another example, in the article "System Study of a 60 GHz Wireless-Powered Monolithic Sensor System", by Yan Wu, J. P. M. G. Linnartz, Hao Gao, P. G. M. Baltus and J. W. M. Bergmans, published at the IEEE 8th International Conference on Information, Communications and Signal Processing (ICICS) in 2011, a speculative system is proposed operating in the 60 GHz band. The sensing tags in this proposal are able to harvest energy and communicate through on-chip antenna's. Desk sensors based on such a technology would amount to being a single chip (IC), without the need for an external antenna. A limitation of this technology is that it only operates in line-of-sight, but for daylight dependent dimming as enabled by the lighting control method according to the present disclosure this is actually a benefit, because in that case luminaries only obtain information from desk sensors that are within line-of-sight.

FIG. 1 illustrates a lighting control system according to an exemplary embodiment of the invention. The lighting control system 100 comprises an RFID-enabled light sensor 102 and an RFID-enabled luminary 112. The RFID-enabled light sensor 102 comprises an RFID interface 104, a controller unit 108 and a light sensor 110. Optionally, the RFID-enabled light sensor 102 comprises a non-volatile memory unit 106. The RFID-enabled luminary comprises an RED reader 114, a controller unit 116, a memory unit 118 and a lighting element 120. The RFID interface 104 and the RFID reader 114 may set up an RFID connection 122. The RFID-enabled light sensor 102 is attached to a working area (not shown), such as a desk or a PC monitor.

In operation, according to an aspect of the invention, the RFID-enabled light sensor 102 measures incident light on the working area, the RFID-enabled luminary 112 periodically reads the measured incident light from said RFID-enabled light sensor 102 via the RFID connection 122, and the RFID-enabled luminary 112 adapts its light level in dependence on the measured incident light.

Figure 2:
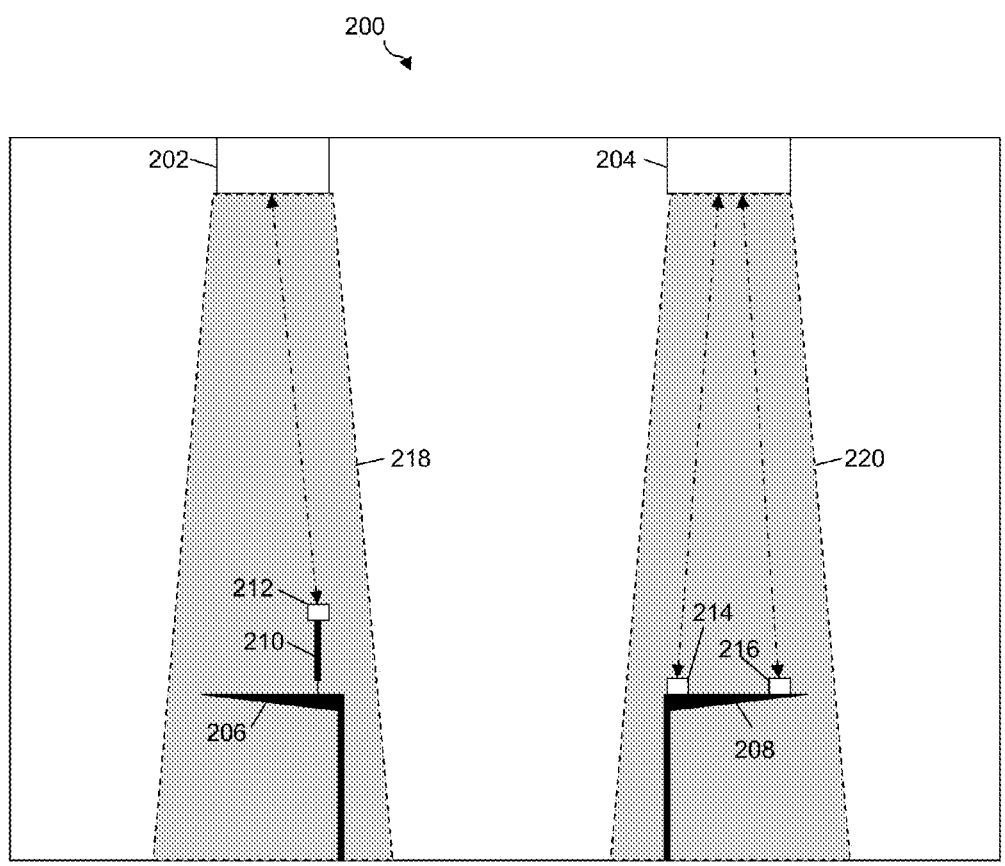
FIG. 2 illustrates a room comprising a lighting control system according to an exemplary embodiment of the invention.

FIG. 2 illustrates a room comprising a lighting control system according to an exemplary embodiment of the invention. The room 200 comprises a lighting control system having two RFID-enabled luminaries 202, 204, several working areas, i.e. two desks 206, 208 and a PC monitor 210, and several RFID-enabled light sensors 212, 214, 216 attached to said working areas. RFID connections have been established between a first luminary 202 and a first light sensor 212 attached to the PC monitor 210, between a second luminary 204 and a second light sensor 214 attached to a desk 208, and between the second luminary 204 and a third light sensor 216 attached to the same desk 208. RFID-enabled luminary 202 produces a light beam 218 that illuminates desk 206. Likewise, RFID-enabled luminary 204 produces a light beam 220 that illuminates desk 208.

Typically, the RFID-enabled luminaries will be ceiling mounted and the desk sensors will be placed on or around the working area with their light sensors facing upwards. For example, the desk sensors may essentially be stickers comprising a sensing RFID tag IC and its antenna, which can be placed on different parts of the desk surface (sensors 214, 216). Alternatively, such a sticker may be attached to the top side of a PC monitor (sensor 212), thereby avoiding that the sensor gets covered by desk clutter altogether. Instead of using stickers, the desk sensors may also be integrated into furniture or devices upon manufacture. Each luminary will typically read the nearest-by sensors (via RFID connections, dotted lines in FIG. 2) and control its light output accordingly.

According to an exemplary embodiment of the lighting control method, an RFID-enabled luminary periodically (e.g. every few minutes) performs the following steps:

1. The luminary reads the light sensor of its associated desk sensor by means of its RFID reader.
2. The luminary compares the light value sensed to its set point.
3. If the light value sensed does not match the set point, the luminary adapts (i.e. increases or decreases) the output of its lighting element accordingly.

In this exemplary embodiment, it is assumed that a single RFID-enabled sensor is associated with the RFID-enabled luminary.

The purpose of this method is to maintain a predefined illumination level, i.e. an illumination level corresponding to a set point, on the working area. To avoid frequent and annoying changes in light intensity due to accidental changes in light sensor readouts, for example caused by people moving around, multiple consecutive light sensor readings may be averaged (i.e. filtered) and also the light intensity may be adapted gradually. Such measures are considered to be known as such.

The benefits of disclosed lighting control method and system are low cost, fully automatic commissioning and ease-of-retrofit. The low cost is a consequence of the desk sensor being ultra-low cost: a simple sensing tag without a power source of its own, that may take the shape of a sticker or a furniture-integrated IC. The automatic commissioning is a consequence of the short operating distance of the RFID communication and supply of power: a luminary will only be able to access desk sensors within its scope of illumination.

Retrofitting an existing building with RFID-enabled luminaries of the kind set forth is comparable in terms of effort and cost, to retrofitting it with luminaries with a built-in light sensor (i.e. to a daylight dependent dimming system that relies on measuring reflected light). In one scenario, the luminaries in the building are of a non-dimming type and all luminaries will be replaced with new luminaries featuring daylight dependent dimming. In another scenario, the luminaries in the building already have dimming-capable ballasts. In this case, a small RFID reader and lighting control assembly (featuring a 0-10V control signal output) could be added to a luminary. If the current source of the 0-10V control signal input of the dimmable ballast turns out to be insufficient for driving the RFID reader and lighting control assembly, a separate mains supply can be provided as part of the assembly and connected to the mains supply of the ballast.

Set Point Control Via Handheld RFID Reader

A luminary implementing the lighting control method disclosed herein periodically compares the light level determined by the desk sensor with a set point and adapts its light output Ideally, this set point should be modifiable by an end-user (i.e. a person working behind the desk) depending on his/her personal illumination needs.

In an exemplary embodiment, the set point is written into the non-volatile memory of the desk sensor by means of a second—in this case, portable—RFID reader. In this embodiment, the luminary periodically reads both the light sensor and the set point from the desk sensor and uses this set point (instead of a fixed and predetermined set point) to determine whether and how to adapt its light output. The portable RFID reader may or may not use the same RFID standard as the luminary.

Figure 3:
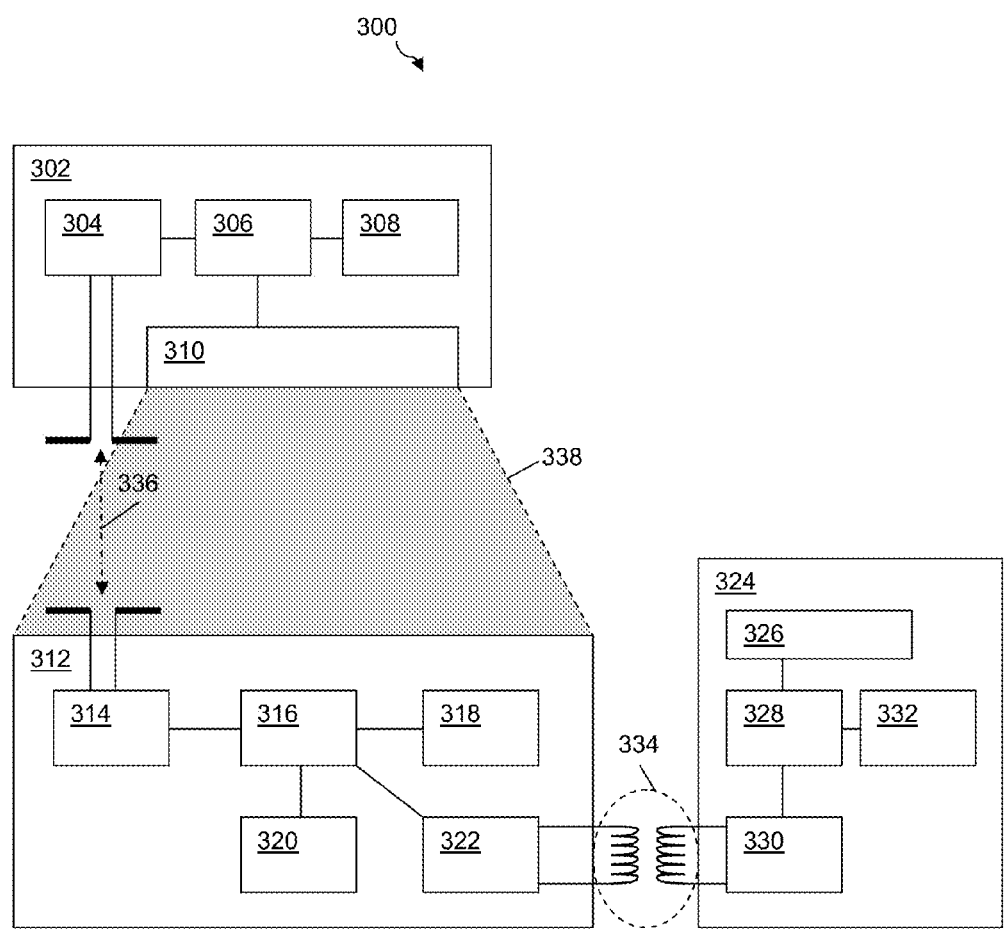
FIG. 3 illustrates an extended lighting control system according to an exemplary embodiment of the invention.

FIG. 3 illustrates an extended lighting control system according to an exemplary embodiment of the invention. In this example, the lighting control system 300 comprises an RFID-enabled luminary 302 and an RFID-enabled light sensor 312. RFID-enabled luminary 302 produces a light beam 338 that illuminates a working area (not shown) to which RFID-enabled light sensor 312 is attached. Furthermore, the lighting control system 300 comprises a handheld RFID reader, more specifically an NFC-enabled device 324. The RFID-enabled luminary 302 comprises an RFID reader (UCODE) 304, a controller unit 306, a memory unit 308, and a lighting element 310. The RFID-enabled light sensor 312 comprises an RFID interface (UCODE) 314, a controller unit 316, a light sensor 318, a non-volatile memory unit 320, and an NFC interface 322. The NFC-enabled device 324 comprises user interaction means 326 (e.g. a graphical user interface), a controller unit 328, an NFC reader 330, and a memory unit 332. The RFID reader 304 and the RFID interface 314 may set up an RFID connection 336 in order to enable the RFID-enabled luminary 302 to read both the measured incident light and the set point from the RFID-enabled sensor 312. The NFC interface 322 and the NFC reader 330 may set up an NFC connection 334. The NFC-enabled device 324 may be used to change a set point stored in the non-volatile memory 320 of the RFID-enabled sensor 312 via the NFC connection 334.

Thus, a desk sensor may have two (passive) RFID interfaces; for example, one UCODE interface supporting medium range communication with the luminary and one NFC interface supporting centimeter-range communication with the portable device. This NFC-enabled portable device may, for example, be an NFC-enabled mobile phone or web tablet. In this particular variant, the end-user must bring his/her mobile phone in close proximity of the desk sensor to change the set point. It is also possible to have the portable device first read the current set point from the desk sensor and visualize that value on its display. Subsequently, the end-user can modify this setting, after which the portable device writes it back into the desk sensor.

Figure 4:
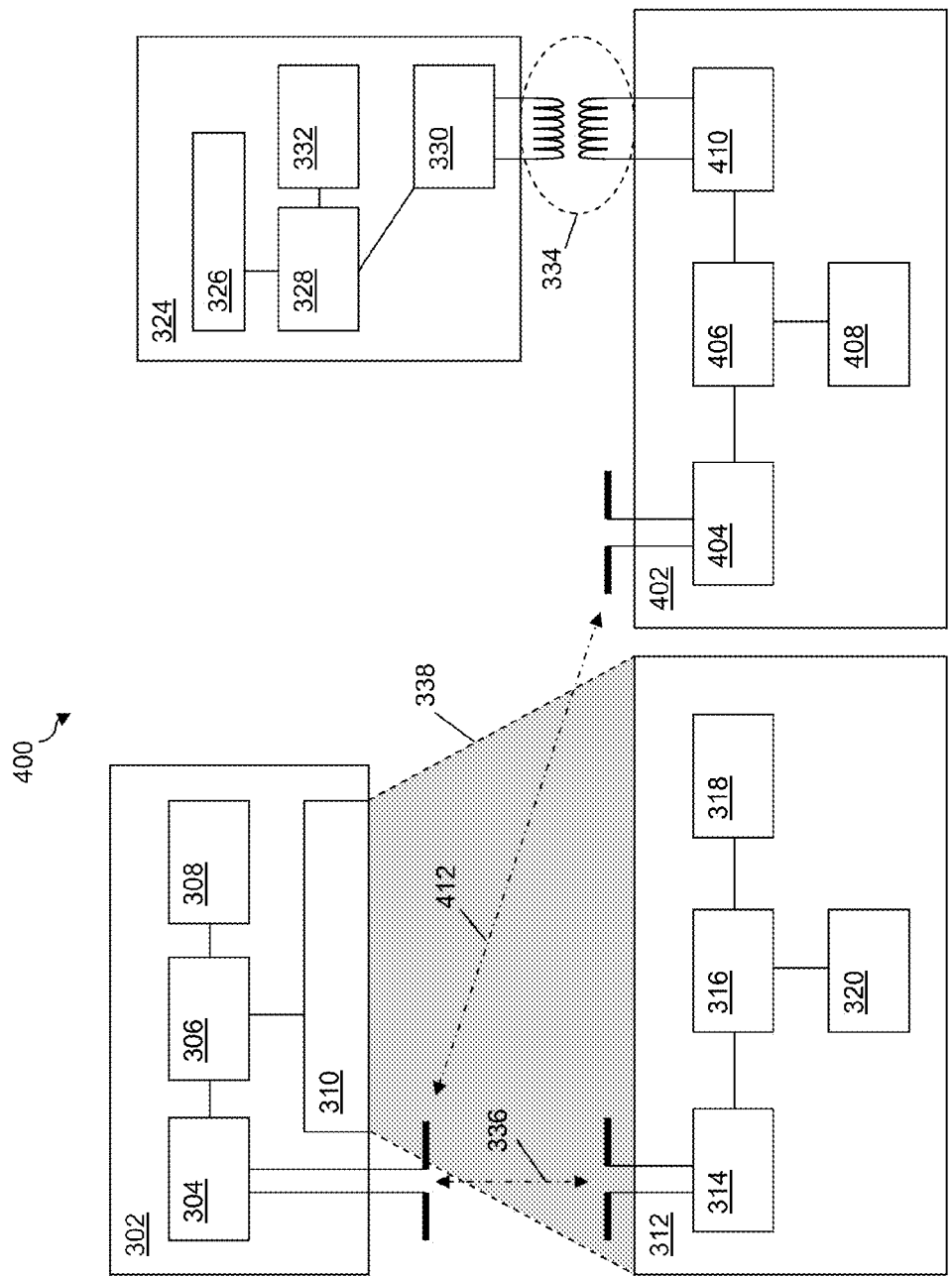
FIG. 4 illustrates a further extended lighting control system according to an exemplary embodiment of the invention.

FIG. 4 illustrates a further extended lighting control system according to an exemplary embodiment of the invention. In this embodiment, the set point is stored in an RFID device, i.e. a user interface RFID tag 402, which is different from the RFID-enabled sensor 312. In particular, the lighting control system 400 comprises, besides the elements described with reference to FIG. 3, a user interface RFID tag 402 that comprises an RFID interface (UCODE) 404, a controller unit 406, a non-volatile memory unit 408, and an NFC interface 410. It is noted that the RFID-enabled sensor 312 no longer needs an NFC interface. The RFID reader 304 and the RFID interface 314 may set up an RFID connection 336 in order to enable the RFID-enabled luminary 302 to read the measured incident light from the RFID-enabled sensor 312. The RFID reader 304 and the RFID interface 404 may set up an RFID connection 412 in order to enable the RFID-enabled luminary 302 to read the set point from the RFID-enabled sensor 312. The NFC interface 410 and the NFC reader 330 may set up an NFC connection 334. The NFC-enabled device 324 may be used to change a set point stored in the non-volatile memory 408 of the user interface RFID tag 402 via the NFC connection 334.

Thus, two RFID tags are provided: (1) the desk sensor comprising a medium range RFID interface (e.g. UCODE) and a light sensor and (2) a dual-mode tag comprising a medium range RFID interface (e.g. UCODE), a short range RFID interface (e.g. NFC) and a non-volatile memory. The first tag (i.e. desk sensor) may be attached to, for example, the top side of a PC monitor exposing it optimally to the light from the luminary, whereas the second tag (i.e. "UI tag") may be attached to the PC keyboard or another location on the desk within close reach of the end-user. In this case, the end-user will update the set point by modifying a variable stored in the non-volatile memory of the second tag and the luminary will read the light sensor from the first tag and the set point from the second tag. In this embodiment, it may be necessary for both tags to uniquely refer to the same desk. The topic of multiple tags uniquely referring to the same desk is discussed in more detail in the section "Daylight dependent dimming involving multiple desk sensors per desk" below.

Automatic Commissioning Involving Multiple Desks and Luminaries

This section addresses the situation when multiple desks and multiple luminaries are present in a single area. In this case, the daylight dependent dimming system must provide (at least) sufficient light (as determined by the respective set point) to each desk. It is noted that the case of multiple desk sensors on a single desk is not dealt with in this section; a single desk sensor per desk is assumed. The case of multiple desk sensors on a single desk will be discussed in the section "Daylight dependent dimming involving multiple desk sensors per desk".

An exemplary method is described that, in a first variant, assigns each desk sensor to a single luminary. Specifically, a particular desk sensor will be assigned to the luminary that is "closest by". For this to happen, a certain "closeness measure" is determined in real-time. Assignment of a particular desk sensor to a luminary means that the luminary will take the light level measured by that desk sensor (and optionally the set point also provided by it) into account to provide at least the illumination level to the desk as defined by the set point. It is possible, however, that two or more desk sensors get assigned to a particular luminary. This means that two or more desks get "serviced" by this particular luminary. In this case, the luminary must provide at least sufficient light to each of the desks or desk sensors as defined by their respective set points. Also, it must not provide more light than necessary to reach this condition.

In other words, for each assigned desk i, with set point $S_i$ and illumination value $L_i$ (as measured by the desk sensor at desk i) the following must hold: $L_i >= S_i$. Furthermore, it must not be possible to further dim the lighting element of the luminary without violating that condition.

In a second variant, "orphaned luminaries" (i.e. luminaries that would not get any desk sensor assigned in a method according to the abovementioned first variant) may operate as a slave to another luminary (master) that has a desk sensor assigned. Communication from the master to the slave is performed via one of the assigned desk sensors.

Figure 5:
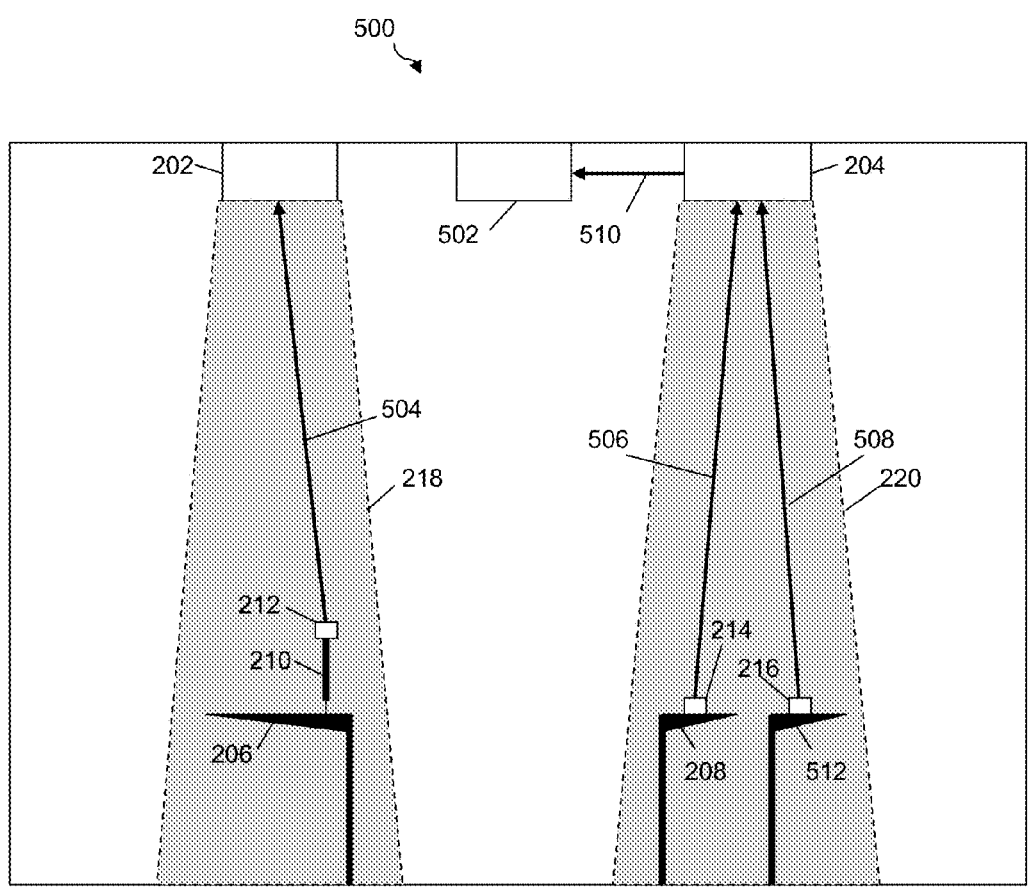
FIG. 5 illustrates a further room comprising a lighting control system according to an exemplary embodiment of the invention.

FIG. 5 illustrates a further room comprising a lighting control system according to an exemplary embodiment of the invention. In particular, the different types of relationships defined between desk sensors and luminaries are illustrated. The "closeness measure" is illustrated by means of physical distance.

The further room 500 comprises, in addition to the room 200 illustrated in FIG. 2, an RFID-enabled luminary 502 which operates as a slave luminary to the RFID-enabled luminary 204. This is shown as a master-slave relationship 510. Furthermore, assignment relationships 504, 506, 508 between the RFID-enabled luminaries 202, 204 and the RFID-enabled light sensors 212, 214, 216 are shown explicitly. It is noted that the same assignment relationships exist in FIG. 2. One 216 of the RFID-enabled light sensors 212, 214, 216 is placed on a third desk 512. The light beam 220 produced by RFID-enabled luminary 204 now illuminates both desk 208 and desk 512. In this case, RFID-enabled luminary 204 will make sure that the illumination on both desks 208, 512 matches the set point.

The exemplary method is based on using a certain closeness measure and on using tags (i.e. desk sensors) as communication/coordination means between a plurality of luminaries. The latter avoids the need for a dedicated control network (e.g. DALI, ZigBee, KNX, LonWorks, etc) in between the luminaries.

Closeness

The luminary that a particular desk sensor gets assigned to, is the one that is closest by according to a certain closeness measure. This is based on the idea that the closest by luminary will have the biggest impact on the illumination of the desk by changing the output level of its lighting element.

The following list provides a number of example closeness measures. Any (weighted) combination of these closeness measures is also conceivable.

RF-based closeness:
  Received Signal Strength Indicator (RSSI).
  Time-of-Flight (ToF).
  Angle of arrival. The idea is that a desk sensor directly underneath a luminary—i.e. 90 degree angle with ceiling—is most impacted by its lighting output. Determining this measure would require some form of antenna array.

Illumination-based closeness:
  Change in light intensity (lux) as measured by the light sensor in response to a certain change in luminary output (% dim-level).
  Change in angle of incident light as measured by the light sensor in response to a certain change in luminary output (% dim-level), The NXP SEN300 multi-modal CMOS-sensor is capable to determine the angle of incident light next to its intensity. This is accomplished by having a plurality of light sensors (specifically, five) in a 2D pattern plus accompanying optics.

To determine "illumination-based closeness" between a particular light sensor and a particular desk sensor, a simple protocol must be executed. For example:

1. The luminary reads the light intensity (and/or angle) from a particular desk sensor.
2. The luminary changes its light output by a pre-defined amount.
3. The luminary reads the light intensity (and/or angle) from that particular desk sensor again.
4. The luminary determines the difference between the reading of step (1) and the reading of step (3) as the "illumination-based closeness".

These steps may be executed multiple times (and the results may be averaged) to achieve a more reliable measurement in the face of accidental light level changes in the environment (i.e. noise).

Luminary Selection

To determine which desk sensors are assigned to it, each luminary will be involved in a selection protocol. For this selection protocol it is necessary that each luminary has a unique identifier assigned to it. Also, a data structure will be maintained in the non-volatile memory of each desk sensor. In particular, said data structure consists of a list of tuples. Each tuple in the list will comprise a luminary unique identifier and the closeness of that luminary to the desk sensor maintaining the list. Per luminary, at most one tuple can be stored, i.e. a newer tuple with a particular unique luminary identifier will overwrite a previous tuple with that same unique identifier.

The selection protocol executed by each luminary comprises the following steps:

1. The luminary determines all desk sensors accessible to it (i.e. all desk sensors within the RE range).
2. For each desk sensor accessible, the luminary performs the following steps:
  a. Determine the closeness of this particular desk sensor (according to a particular closeness measure, for example, as defined above).
  b. Create a tuple comprising the luminary's unique identifier and this closeness and write it into the tuple list in the non-volatile memory of the desk sensor.
  c. Compare the closeness of this luminary to the closeness as stored in each of the other tuples in the list. If this luminary is the closest, add this desk sensor to the set of desk sensors assigned to this luminary.

Preferably, the selection protocol must be executed again when something changes in the setup of the lighting control system. For example, when a desk is added to, moved within or removed from the area.

Any luminary may suspect a change in closeness of a particular desk sensor assigned to it, if during normal operation (i.e. during execution of the method according to the first aspect of the invention) a change in response of the light sensor to a certain change in dim-level is detected that differs significantly from the response experienced previously. When a luminary suspects such a change, it may execute the abovementioned selection protocol again. Alternatively, or in addition, it may execute the selection protocol periodically (e.g. every day at midnight).

Any (other) luminary must verify whether it is still the closest to a particular desk sensor each time the method according to the invention is executed (i.e. each time it goes through the control loop) by inspecting the list of tuples stored in the desk sensor. If it detects it is no longer the closest, this desk sensor is no longer assigned to that luminary and this particular luminary must no longer take it into account in its control loop.

It is also possible that the selection protocol is fully integrated into the control loop of the method according to the first aspect of the invention:

1. Luminary reads light sensor light value, optional set point and list of tuples from all desk sensors within its RF range.
2. Luminary determines the subset of desk sensors for which it is the closest according to the closeness measures stored in the tuple list. This is defined as the set of desk sensors assigned to this luminary.
3. Luminary compares the light values read from the set of assigned desk sensors to their respective set points.
4. Depending on the outcome of these comparisons, the luminary adapts (i.e. increases or decreases) the light output of its lighting element accordingly. Luminary may repeatedly read light values from the set of assigned desk sensors while adapting the light output until an output level is reached at which all desk sensors receive at least as much light as defined by their respective set points (and also not more light than necessary to reach this condition).
5. Luminary determines a new closeness measure for each desk sensor based on its respective responses to the changes in light output of step (4).
6. Luminary updates its tuples in the respective desk sensors, if the closeness measure has changed (or only if it has changed significantly, i.e. if it exceeds a certain threshold).

Orphaned Luminaries

In any area with multiple luminaries, the following situation may occur: one or more luminaries have no assigned desk sensors, because every desk sensor is closer to another luminary. A luminary without any assigned desk sensors is also called an "orphaned luminary". The simplest example is an office with only a single desk (and hence a single desk sensor) and two or more luminaries. In the embodiments described in the foregoing, this will result in only one luminary performing daylight dependent dimming and all other luminaries assuming a fixed lighting level. It is noted that a fixed lighting level may also mean no light at all.

In the single desk office example, it is not desirable if only one luminary is switched on and the rest of the room is dark. This will reduce the visual comfort of the person setting behind the desk. Or more in general, it is not desirable to have dark corners in places where there are no desks.

Therefore, an adaptation (or extension) of the methods as described in the foregoing is proposed. The purpose of this adaptation is to slave every first luminary to another second luminary that does have at least one desk sensor assigned to it. Specifically, this second luminary will be the "owner" of the desk sensor that is closest to the first luminary (in the sense that any other desk sensor is farther away from this first luminary). A second luminary "owns" a desk sensor if that desk sensor is assigned to it (i.e. if it is the luminary closest to that desk sensor).

To achieve that purpose, the selection protocol executed by each luminary as described above is adapted. In particular, step (3) is added:

1. The luminary determines all desk sensors accessible to it (i.e. all desk sensors within the RF range).
2. For each desk sensor accessible, the luminary performs the following steps:
   a. Determine the closeness of this particular desk sensor (according to a particular closeness measure, for example, as defined above).
   b. Create a tuple comprising the luminary's unique identifier and this closeness and write it into the tuple list in the non-volatile memory of the desk sensor.
   c. Compare the closeness of this luminary to the closeness as stored in each of the other tuples in the list. If this luminary is the closest, add this desk sensor to the set of desk sensors assigned to this luminary.
3. If the set of desk sensors assigned to this luminary is empty (i.e. if this is an orphaned luminary) the luminary performs the following steps:
   a. Determine the "closest by" desk sensor by comparing all the closeness values as determined in step (2a).
   b. Determine the "owner" of that "closest by" desk sensor by searching the list of tuples stored in that desk sensor.
   c. Create an entry in a "slave" table stored in the non-volatile memory of the same desk sensor, the entry comprising this luminary's unique identifier.

Any "master" luminary (i.e. any luminary "owning" one or more desk sensors) must now inspect the slave table of each of the desk sensors it "owns" while executing the control loop (i.e. the method according to the first aspect of the invention). If at least one slave luminary is present in that table, it will write its new dim level into a particular location of the non-volatile memory of the particular desk sensor.

Any "slave" luminary will regularly (e.g. every few seconds) inspect the dim level of its master as stored in the desk sensor. It will follow the master's dim level if it changes.

Optionally, a handshake protocol may be executed between the master and each of the individual slaves, by the master setting a flag in the slave's entry in the slave table to indicate an update of the dim level and the slave clearing the flag after adapting its dim level accordingly. This way the master is aware that the slave has updated its dim level and it can again verify the light sensor to test whether the desired illumination level on the desk has been reached.

Daylight Dependent Dimming Involving Multiple Desk Sensors Per Desk

As briefly outlined above, a plurality of desk sensors may be employed on a single desk to provide more robustness in case of a cluttered desk. It should be noted however, that mounting a single sensor on top of the PC monitor may be a more effective and efficient solution to the same problem.

Commissioning

In this embodiment all desk sensors on a single desk should be assigned a common "desk identifier". This is also the case for an optional "UI tag" as discussed in "Set point control via handheld RFID reader". Typically, this common desk identifier will be stored in a pre-defined location of the non-volatile memory of the respective tags (i.e. desk sensors or UI tag).

Ensuring that all tags for a single desk carry the same desk identifier requires an additional commissioning activity. One possibility is to use a portable NFC-enabled device to execute this commissioning step.

In a typical implementation this may imply that the tags are dual-mode tags supporting both NFC and, for example, UCODE. The commissioning activity comprises the following steps:

1. The person performing the commissioning activity touches a first tag with the NFC-enabled portable device. The UID (unique ID of each tag as assigned upon manufacture) is read from this first tag and also written into the pre-defined "desk identifier" location of the non-volatile memory of that tag.

2. The person performing the commissioning activity subsequently touches each of the other tags for that desk. The UID is also written into the pre-defined "desk identifier" location of the non-volatile memory of those tags.

Alternatively, the NFC-enabled portable device may generate a unique desk identifier itself (with or without user interaction) and this desk identifier is written into all the tags for that desk by touching those tags subsequently.

Control

The method according to the first aspect of the invention may be adapted to deal with multiple desk sensors per desk. For this purpose, the luminary periodically (e.g. every few minutes) performs the following steps:

1. Luminary reads the light sensors of all desk sensors associated with a particular desk by means of its RFID reader.

2. The luminary determines the maximum value obtained by any of the light sensors.

3. Luminary compares this light value to its set point.

4. If the light value sensed does not match the set point, the luminary adapts (i.e. increases or decreases) the output of its lighting element accordingly.

The underlying assumption of this method is that any light sensor is appropriately placed to return a value representative of the actual illumination of the desk surface, provided that it is not obscured (i.e. the light path from the luminary towards the sensor is not blocked). Any light sensor that is obscured will return a lower (and non-representative) value.

It is noted that the drawings are schematic. In different drawings, similar or identical elements are provided with the same reference signs. Furthermore, it is noted that in an effort to provide a concise description of the exemplary embodiments, implementation details which fall into the customary practice of the skilled person may not have been described. It should be appreciated that in the development of any such implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill.

The above-mentioned embodiments illustrate rather than limit the invention, and the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. The invention may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE NUMBERS 100 lighting control system
102 RFID-enabled light sensor
104 RFID interface
106 non-volatile memory unit
108 controller unit
110 light sensor
112 RFID-enabled luminary
114 RFID reader
116 controller unit
118 memory unit
120 lighting element
122 RFID connection
200 room
202 RFID-enabled luminary
204 RFID-enabled luminary
206 desk
208 desk
210 PC monitor
212 RFID-enabled light sensor
214 RFID-enabled light sensor
216 RFID-enabled light sensor
218 light beam
220 light beam
300 lighting control system
302 RFID-enabled luminary
304 RFID reader (UCODE)
306 controller unit
308 memory unit
310 lighting element
312 RFID-enabled light sensor
314 RFID interface (UCODE)
316 controller unit
318 light sensor
320 non-volatile memory unit
322 NFC interface
324 NFC-enabled device
376 user interaction means
328 controller unit
330 NFC reader
332 memory unit
334 NFC connection
336 RFID connection
338 light beam
400 lighting control system
402 user interface RFID tag
404 RFID interface (UCODE)
406 controller unit
408 non-volatile memory unit
410 NFC interface
412 RFID connection
500 room
502 RFID-enabled luminary
504 assignment relationship
506 assignment relationship
508 assignment relationship
510 master-slave relationship
512 desk

The invention claimed is:

1. A lighting control system for controlling illumination, comprising:
   an RFID-enabled light sensor configured to measure incident light, and
   an RFID-enabled luminary configured to receive RFID signals from the RFID-enabled light sensor, and
   wherein the RFID-enabled luminary is configured to periodically receive RFID signals containing measured incident light readings from said RFID-enabled light sensor and
   wherein the RFID-enabled luminary is configured to adapt the luminary's light level in dependence on the measured incident light, such that a predefined illumination level is maintained.

2. A lighting control system as claimed in claim 1,
   wherein the RFID-enabled luminary is configured to adapt its light level by comparing the measured incident light with a set point, and
      adjusting the light output of a lighting element embedded in said RFID-enabled luminary in dependence on the result of said comparing.

3. A lighting control system as claimed in claim 2,
   wherein the set point is stored in the RFID-enabled luminary.

4. A lighting control system as claimed in claim 2, wherein the set point is stored in the RFID-enabled light sensor and the RFID-enabled luminary is configured to read both the measured incident light and the set point from the RFID-enabled light sensor.

5. A lighting control system as claimed in claim 4,
   wherein the set point is written into a non-volatile memory unit of the RFID-enabled light sensor by means of a portable RFID reader.

6. A lighting control system as claimed in claim 2,
   wherein the set point is stored in a user interface RFID tag and the RFID-enabled luminary is configured to read the set point from said user interface RFID tag.

7. A lighting control system as claimed in claim 1,
   wherein a further RFID-enabled light sensor attached to a working area is configured to measure the incident light on the working area,
   wherein the RFID-enabled luminary is configured to periodically read the measured incident light from the RFID-enabled light sensor and from the further RFID-enabled light sensor, and
   wherein the RFID-enabled luminary is configured to adapt its light level in dependence on the incident light measured by both the RFID-enabled light sensor and the further RFID-enabled light sensor.

8. A lighting control system as claimed in claim 1,
   wherein the RFID-enabled light sensor attached to a working area;
   wherein a further RFID-enabled light sensor coupled to a further working area is configured to measure the incident light on the further working area,
   wherein the RFID-enabled luminary is configured to periodically read the measured incident light from the RFID-enabled light sensor and from the further RFID-enabled light sensor, and
   wherein the RFID-enabled luminary is configured to adapt its light level in dependence on the incident light measured by both the RFID-enabled light sensor and the further RFID-enabled light sensor, such that a predefined illumination level on both the working area and said further working area is maintained.

9. A lighting control system as claimed in claim 1,
   wherein the system is configured to execute a selection protocol in order to assign the RFID-enabled light sensor to the RFID-enabled luminary.

10. A lighting control system as claimed in claim 9,
    wherein the selection protocol is based on an RF-based closeness measure and/or an illumination-based closeness measure.

11. A lighting control system as claimed in claim 10,
    wherein said RF-based closeness measure and/or illumination-based closeness measure are stored in a memory unit of the RFID-enabled light sensor.

12. A lighting control system as claimed in claim 1,
    wherein a further RFID-enabled luminary is configured to operate as a slave luminary to the RFID-enabled luminary.

13. A lighting control system as claimed in claim 12,
    wherein no RFID-enabled light sensor is assigned to the further RFID-enabled luminary, and
    wherein the further RFID-enabled luminary is closer to said RFID-enabled light sensor than to any further RFID-enabled light sensor.

14. A lighting control system as claimed in claim 12,
    wherein the further RFID-enabled luminary is configured to adapt its light level in dependence on the incident light measured by said RFID-enabled light sensor to substantially the same degree as the RFID-enabled luminary adapts its light level.

15. A lighting control system for controlling illumination of a working area, said lighting control system comprising
    at least one RFID-enabled light sensor coupled to said working area and
    at least one RFID-enabled luminary,
    wherein the RFID-enabled light sensor is arranged to measure incident light on the working area, and
    wherein the RFID-enabled luminary is configured to periodically read, via a RFID connection to the RFID-enabled light sensor, the measured incident light and to adapt its light level in dependence on the measured incident light, such that a predefined illumination level on the working area is maintained.

16. A lighting control system as claimed in claim 1,
    wherein the RFID-enabled light sensor is a sticker attached to a working area.

17. A lighting control system as claimed in claim 1,
    wherein the RFID-enabled light sensor is integrated into a working area.

18. A lighting control system as claimed in claim 1,
    wherein the RFID-enabled light sensor attached to a working area;
    wherein the working area is a piece of furniture, in particular a desk, or an apparatus for personal use, in particular a PC monitor.

* * * * *